(12) United States Patent
Matsuda et al.

(10) Patent No.: US 6,470,993 B1
(45) Date of Patent: Oct. 29, 2002

(54) ELECTRIC POWER STEERING APPARATUS

(75) Inventors: Akinobu Matsuda, Nara; Masayuki Watanabe, Uji; Terukazu Nakajima, Yamatotakada; Kaname Joshita, Osaka, all of (JP)

(73) Assignee: Koyo Seiko Co., Ltd., Osaka (JP)

( * ) Notice: Subject to any disclaimer, the term of this patent is extended or adjusted under 35 U.S.C. 154(b) by 0 days.

(21) Appl. No.: 09/187,773

(22) Filed: Nov. 6, 1998

(30) Foreign Application Priority Data

Nov. 10, 1997 (JP) .............................................. 9-307634

(51) Int. Cl.$^7$ .......................... B62D 5/04; F16H 57/00; F16H 1/04; F16D 7/02; F15B 9/10
(52) U.S. Cl. ......................... 180/444; 74/411; 74/422; 74/457; 74/498; 74/388 PS; 464/41; 91/375 A
(58) Field of Search ................................ 180/444, 443; 74/411, 422, 498, 388 PS, 457; 464/41; 91/375 A

(56) References Cited

U.S. PATENT DOCUMENTS

| | | | |
|---|---|---|---|
| 4,890,683 A | | 1/1990 | Matsuda et al. ............ 180/444 |
| 4,898,258 A | | 2/1990 | Ohe et al. .................. 180/79.1 |
| 5,133,423 A | * | 7/1992 | Ijiri et al. ..................... 180/444 |
| 5,145,021 A | * | 9/1992 | Nakamura et al. .......... 180/444 |
| 5,445,237 A | * | 8/1995 | Eda et al. .................... 180/444 |
| 5,819,871 A | * | 10/1998 | Takaoka ...................... 180/444 |
| 5,836,419 A | * | 11/1998 | Shimizu et al. ............. 180/443 |
| 5,971,094 A | * | 10/1999 | Joshita ........................ 180/444 |
| 6,164,407 A | * | 12/2000 | Cheng ......................... 180/444 |

FOREIGN PATENT DOCUMENTS

EP 0 741 067 11/1996

OTHER PUBLICATIONS

Abstract of Japanese Application No. 08080858 (Nippon Seiko KK) dated Mar. 26, 1996.

* cited by examiner

Primary Examiner—Daniel G. DePumpo
Assistant Examiner—Matthew Luby
(74) Attorney, Agent, or Firm—Darby & Darby

(57) ABSTRACT

An electronic power steering apparatus according to the present invention uses hypoid gears having a larger gear on a steering assisting motor side and a smaller gear on a pinion shaft side as a transmission device for transmitting a rotational force of the motor to the pinion shaft or a column shaft, thereby reducing a shaft-to-shaft distance required between the motor and the pinion shaft. Further, rack teeth, which have a pressure angle that reduces toward both of the ends of a moving stroke of a rack shaft, are formed on the rack shaft that engages the pinion gear so that an insufficient steering assisting force is supplemented at the stroke ends, that is, at a large steering range; thus, it is possible to miniaturize the motor. Therefore, it becomes possible to reduce a space occupied by the motor on the periphery of the column shaft or the pinion shaft, and consequently to allow easy installation inside the automobile room or the engine room.

8 Claims, 5 Drawing Sheets

ELECTRIC POWER STEERING APPARATUS

BACKGROUND OF THE INVENTION

The present invention relates to an electric power steering apparatus which uses an electric motor as a source of an steering assisting force, and more particularly concerns an electric power steering apparatus having a construction in which a steering operation in a rack-pinion type steering mechanism is assisted by a rotational force of the electric motor.

An electric power steering apparatus, which drives an electric motor for steering assistance based upon the result of detection of a steering torque applied to a steering wheel and transmits a rotational force of the electric motor to a steering mechanism so as to assist the operation of the steering mechanism, has the advantage that the assisting force characteristics can be controlled more easily depending on travelling conditions, such as the speed of a automobile and the frequency of steering operations, as compared with a hydraulic power steering apparatus using a hydraulic actuator as a source of a steering assisting force.

However, the disadvantage of the above-mentioned electric power steering apparatus is that it is difficult to obtain a small-size electric motor (hereinafter, referred to as motor) which is capable of generating a sufficient rotational force for the steering assistance and that it is difficult to provide a space for the motor on the vicinity of the steering mechanism to which the force is transmitted. Conventionally, in order to solve these problems, a transmission device is interpolated in a halfway of the transmission system between the output side of the motor for steering assistance and the steering mechanism so that the rotational force acquired from the output shaft of the motor is increased by reducing the speed and transmitted to the steering mechanism; thus, the motor is miniaturized while the insufficient output force is supplemented.

With respect to steering apparatuses for automobiles, various types of them have been put into practical use, and those of the rack-pinion type have been known. The steering apparatuses of this type has a construction with which: a rack shaft having rack teeth formed thereon with a predetermined length in the axial direction is installed in a manner so as to extend in the lateral direction with respect to the chassis, both ends of the rack shaft are connected to travelling wheels through tie rods, a pinion shaft which engages the rack teeth is connected to a column shaft connected to a steering wheel so that the rotational movement of the column shaft in accordance with a steering operation is transmitted to the rack shaft through the pinion shaft; thus, the rack shaft is allowed to shift in the axial direction within a range of the formed length of the rack teeth so that the steering operation is carried out.

In the case that such a rack-pinion type steering apparatus is constituted as an electric power steering apparatus, a mechanism which transmits the rotational force of the steering assisting motor to a halfway portion on the column shaft or the pinion shaft that rotates about the shaft is generally adopted. With respect to the transmission device, a worm gear, which has a worm connected to the output end of the motor and a worm wheel fitted to the column shaft or the pinion shaft that are engaged with the worm wheel, and which is capable of providing a high reduction ratio with a simple construction, is widely used.

Here, in the electric power steering apparatus having the above-mentioned construction, the steering control may become inoperative in the event of a locked state of the steering assisting motor; therefore, it is essential to provide a safety measure to avoid the occurrence of such an inoperative state. For this reason, conventionally, an electromagnetic clutch is installed between the transmission device and the output shaft of the motor, and the electromagnetic clutch is disengaged at the time of a locked state of the motor so that the motor in the locked state is cut off from the steering mechanism.

FIG. 1 schematically shows the construction of a transmission system from the motor to the pinion shaft in the electric power steering apparatus having the above-mentioned structure. As illustrated, the electric power steering apparatus is designed so that a worm gear, which is used for increasing the rotational force of a motor M, is provided with a worm $W_2$ that tangentially engages teeth formed on the circumference of a worm wheel $W_1$; therefore, it is essential to maintain a shaft-to-shaft distance $L_1$ corresponding to the sum of radii of the worm wheel $W_1$ and the worm $W_2$ between a pinion shaft 1 (or a column shaft) and the motor M that is coaxially provided with the worm $W_2$, and the motor M needs to be placed at a position far apart from the axial center of the pinion shaft.

In an electric power steering apparatus of the pinion transmission type in which the transmitted rotational force from the motor M is applied to the pinion shaft 1 as shown in the drawing, it is difficult in most cases to install the motor M on the periphery of the pinion shaft 1 that is placed together with the rack shaft in an engine room that has merely limited installation space with the above-mentioned shaft-to-shaft distance $L_1$ therefrom. Moreover, in an electric power steering apparatus of the column transmission type in which the transmitted rotational force from the motor M is applied to the column shaft, the existence of the motor M, placed apart from the column shaft positioned inside the automobile, makes it difficult to provide a sufficient room for driver's legs.

Furthermore, as illustrated in FIG. 1, the above-mentioned electromagnetic clutch C, which carries out the cut-off operation at the time of the locked state of the motor M, is connected to the output side of the motor M; therefore, the existence of the electromagnetic clutch C increases the length $L_2$ of the motor M in the axial direction, making it difficult to ensure the installation position of the motor M.

As described above, in the conventional electric power steering apparatus, an attempt to miniaturize the steering assisting motor that is achieved by adopting a transmission device is cancelled out by the existence of the transmission device and the electromagnetic clutch, thereby failing to effectively achieve the objective to reduce the space occupied by the motor.

BRIEF SUMMARY OF THE INVENTION

The present invention has been made with the aim of solving the above problems, and it is one object of the present invention to provide an electric power steering apparatus which can miniaturize a steering assisting motor as well as miniaturizing a transmission system to a column shaft or a pinion shaft and which easily ensures a space to be occupied by the motor on the periphery of the column shaft or the pinion shaft.

The electric power steering apparatus of the present invention, which is provided with a column shaft that rotates in response to the rotational operation of a steering wheel, a pinion shaft connected to the column shaft, and a rack shaft that moves in the axial direction within a range of its moving stroke corresponding to a formed length of rack teeth that engages the pinion shaft in response to the rotational movement thereof, and which transmits the rotational force of the steering assisting electric motor to the column shaft or the pinion shaft through a transmission device so as to assist the steering operation carried out by the movement of the rack shaft is characterized in that the transmission device is constituted by hypoid gears consisting of a smaller gear on the electric motor side and a larger gear on the column shaft or pinion shaft side and in that the rack teeth are formed so that the pressure angle thereof reduces toward both ends of the moving stroke.

In the present invention, with respect to the transmission device for reducing the rotational speed of the steering assisting electric motor and for transmitting it to the column shaft or the pinion shaft, the hypoid gears, which consist of a smaller gear on the electric motor side and a larger gear on the column shaft or pinion shaft side so that the shaft-to-shaft distance can be maintained small, is adopted. Moreover, the pressure angle of the rack teeth that are formed on the rack shaft and allowed to engage the pinion shaft is set so as to reduce toward the both ends of the moving stroke of the rack shaft; thus, the displacement of the rack shaft per unit rotation of the pinion shaft is minimized at the both ends of the moving stroke, that is, larger steering ranges in which a lot of force is required for steering, so that the insufficient reduction ratio due to the adoption of the hypoid gears is supplemented and the motor is miniaturized. With these arrangements, the space to be occupied by the motor is reduced on the periphery of the column shaft or the pinion shaft, thereby making it possible to easily ensure the installation space of the motor.

Another electric power steering apparatus of the present invention has a construction in which: the larger gear is externally fitted to the column shaft or the pinion shaft, and a slip ring which is provided in the fitting section and which serves as a torque limiter for allowing the fitting section to slide upon application of a force in a circumferential direction that exceeds a predetermined limit, is provided.

In the above-mentioned invention, the slip ring, which is provided in the fitting section between the column shaft or the pinion shaft and the larger gear of the hypoid gears, allows the larger gear to slide on the circumference of the column shaft or the pinion shaft upon application of an excessive force in the circumferential direction that is exerted at the time that the steering assisting motor is locked or at the time that a reverse input is occurred from the travelling wheel side, achieves the cut-off of the motor in the locked state without using an electromagnetic clutch, and protects the teeth of the hypoid gears used for the transmission device at the time that the reverse input from the wheel side is occurred.

The above and further objects and features of the invention will more fully be apparent from the following detailed description with accompanying drawings.

DETAILED DESCRIPTION OF THE INVENTION

Figure 2:
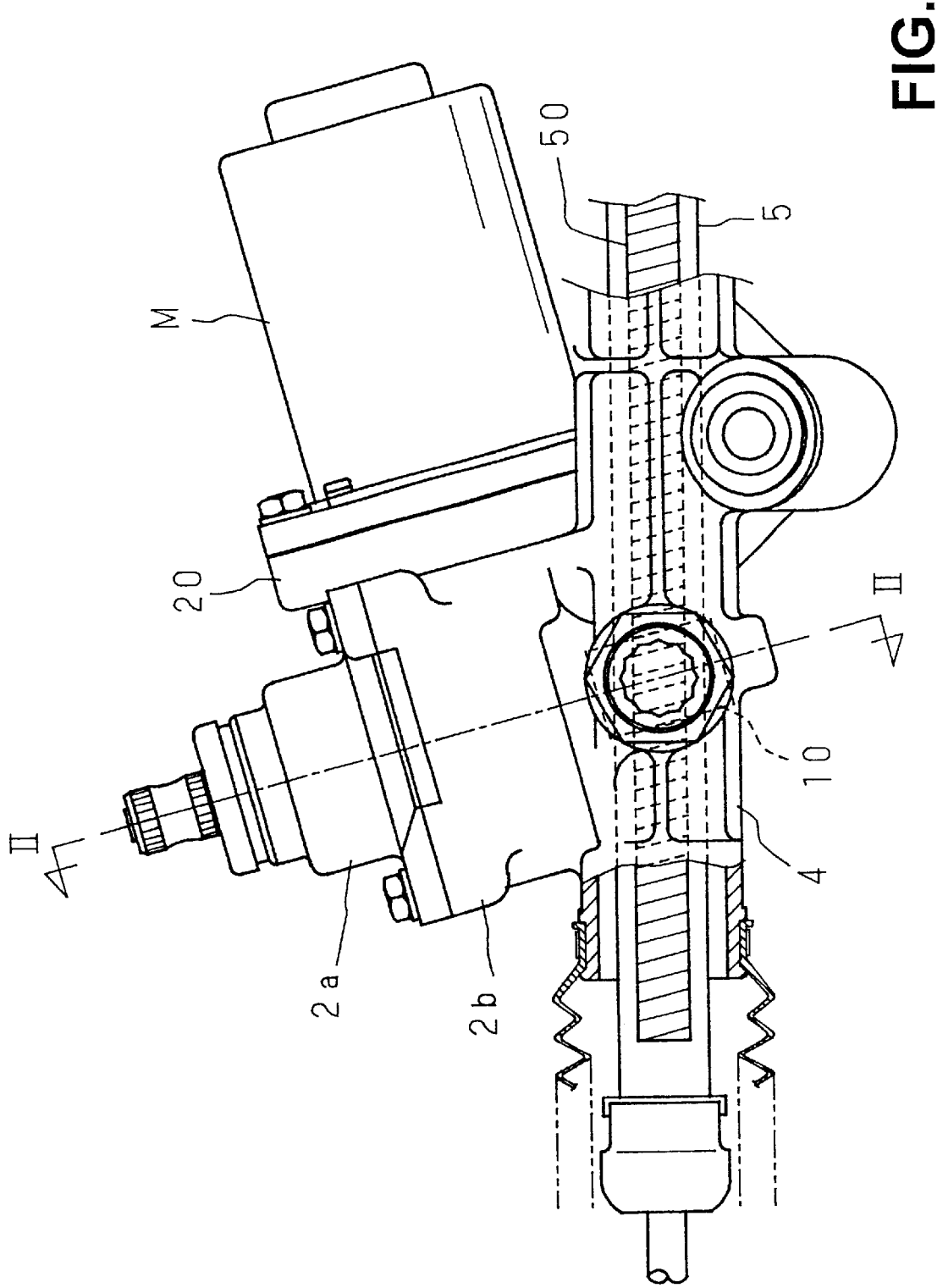
FIG. 2 is a partially exploded front view that shows an essential part of an electric power steering apparatus according to the present invention.
Figure 3:
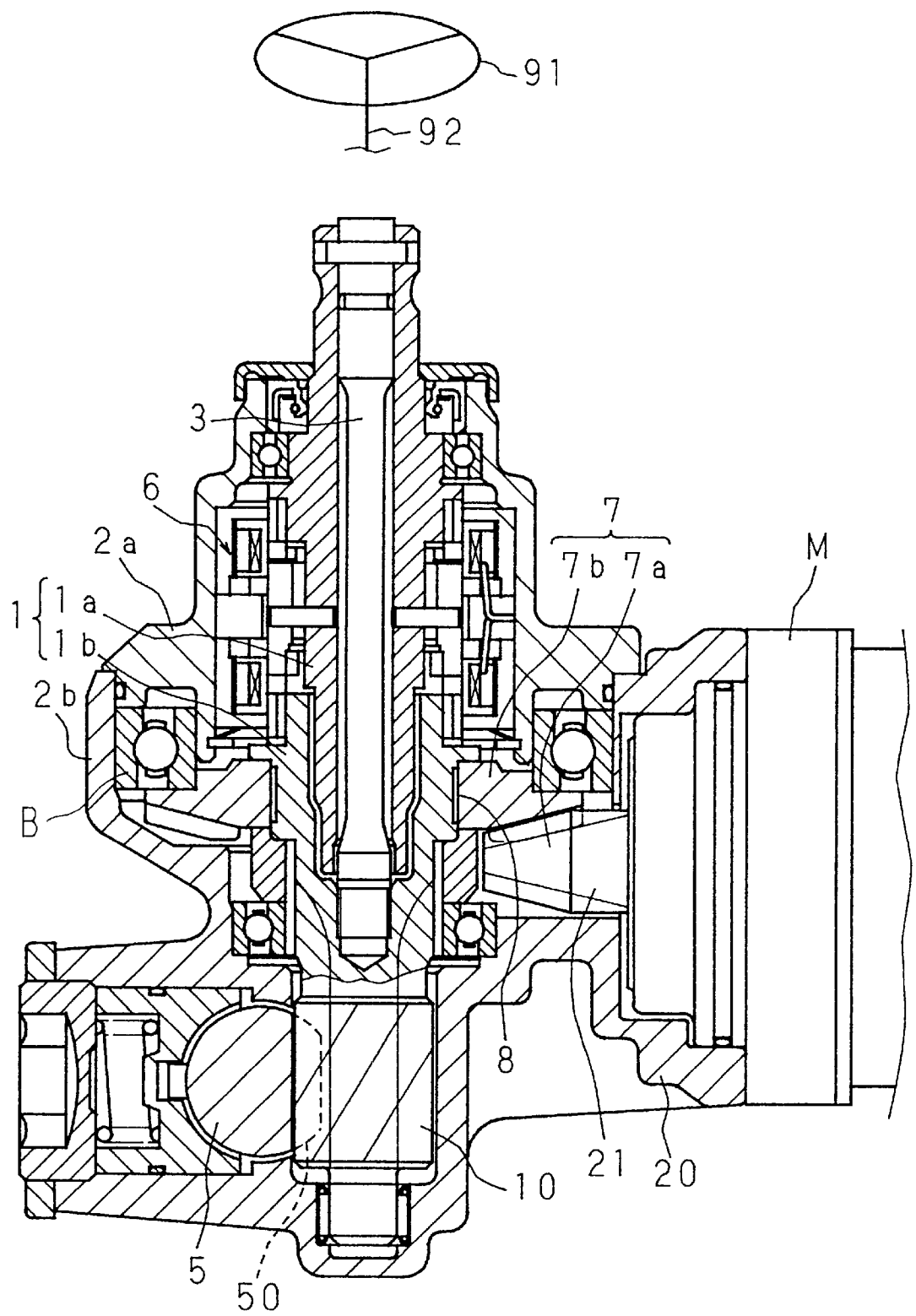
FIG. 3 is a longitudinal cross-sectional view taken along the line II—II in FIG. 2.

The present invention will now be described in detail referring to the accompanying drawings illustrating the embodiments thereof. FIG. 2 is a partially exploded front view that shows an essential part of an electric power steering apparatus according to the present invention, and FIG. 3 is a longitudinal cross-sectional view taken along the line II—II in FIG. 2.

In the drawings, reference numeral 1 is a pinion shaft, and the pinion shaft 1 is provided with an upper shaft 1a and a lower shaft 1b that are coaxially connected to each other through a torsion bar 3, and is rotatably supported inside of a sensor housing 2a and a gear housing 2b that are aligned vertically and both have a cylindrical shape. The upper shaft 1a is allowed to protrude from the upper portion of the sensor housing 2a with a predetermined length. This protruding end is connected to a column shaft 92 whose one end is connected with a steering wheel 91 and which rotates in response to a steering operation. A pinion 10 is integrally formed on the circumference of the lower shaft 1b.

A rack housing 4 is installed at a lower portion of the gear housing 2b in an intersecting manner as an integral part. A rack shaft 5 is supported inside of the rack housing 4 in a manner so as to freely slide in the axial direction. As illustrated in FIG. 2, the rack shaft 5 is provided with rack teeth 50 formed in a range having a predetermined length in the axial direction. The rack teeth 50 are engaged by the pinion 10 formed on the circumference of the lower shaft 1b at the intersecting section with the gear housing 2b so that the rotational movement of the pinion shaft 1 in accordance with the rotational movement of the column shaft 92 is converted to a sliding movement in the axial direction of the rack shaft 5 through the engagement between the pinion 10 and the rack teeth 50, thereby making it possible to carry out a steering operation.

When such a steering operation is carried out, the upper shaft 1a of the pinion shaft 1 is allowed to rotate in accordance with the rotational movement of the column shaft 92. On the other hand, the lower shaft 1b of the pinion shaft 1 is subject to a reaction force from the road surface that is exerted on the travelling wheels that changes course in accordance with the steering operation through the rack shaft 5. Thus, a twisting force corresponding to the amount of the steering torque is exerted on the torsion bar 3 connecting the both shafts 1a and 1b in the direction of the steering torque applied to the column shaft 92 through the steering wheel 91. Reference numeral 6 in the drawing is a torque sensor which detects the steering torque that is applied to the steering wheel 91. The torque sensor 6 includes detection rings that are externally fitted to the upper and lower shafts 1a and 1b respectively, thereby forming a magnetic circuit. The change in magnetic resistance that appears in the magnetic circuit due to the twisting force of the torsion bar 3 is acquired as a change in impedance of a detection coil that is aligned along the circumference of the detection ring. This construction is well known in the art.

The hypoid gears 7 have a larger gear 7b that is externally fitted to the upper half portion of the lower shaft 1b with its teeth side facing down.

Figure 4:
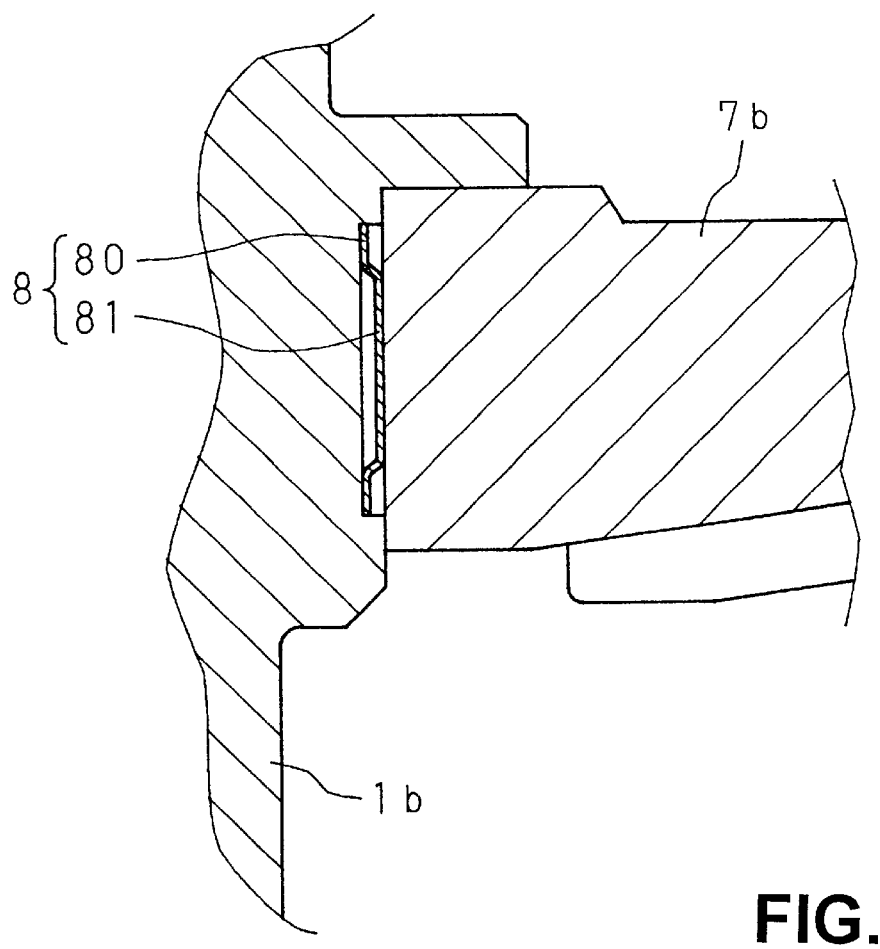
FIG. 4 is an enlarged cross-sectional view showing a fitting section between a larger gear of hypoid gears and a lower shaft shown in FIG. 3.

FIG. 4 is an enlarged cross-sectional view showing this fitting section. The larger gear 7b and the lower shaft 1b are fitted to each other with a slip ring 8 being placed in between. The slip ring 8 is commercially available as a brand name "tolerance ring" (manufactured by RENCOL TOLERANCE RINGS CO.).

Figure 5:
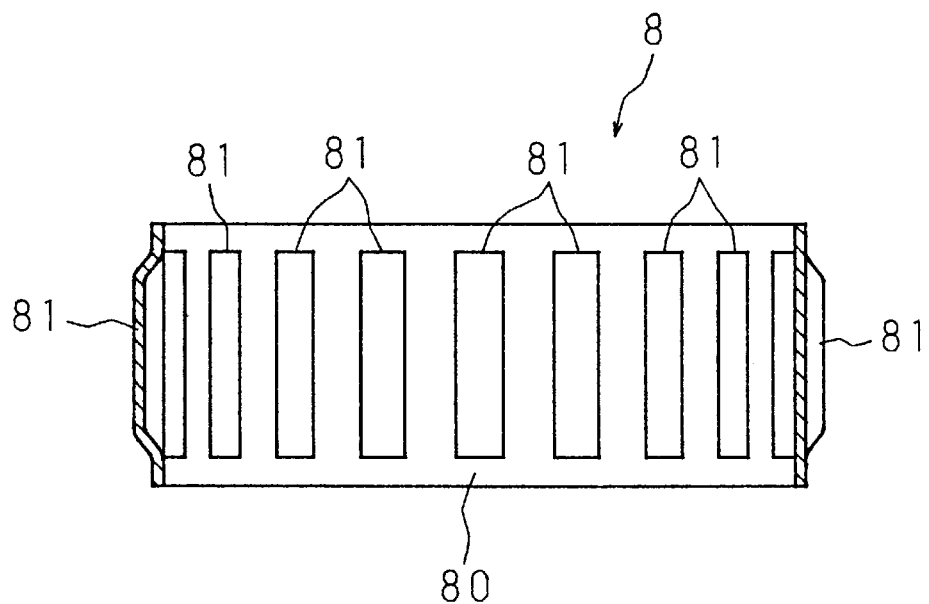
FIG. 5 is a cross-sectional view of a slip ring shown in FIG. 4.

FIG. 5 is a cross-sectional view of this slip ring 8. As illustrated, the slip ring 8 has a construction in which a plurality of protruding portions 81 that have a semi-circular cross-section and stick outward in the radial direction are formed along the circumference of a ring main body 80 made of metal with a thin ring shape as an integral part with predetermined intervals in the circumferential direction.

The larger gear 7b is fitted to the slip ring 8 with this construction at the outside of the lower shaft 1b to which the ring main body 80 is externally fitted. Thus, the slip ring 8 is installed in the fitting section of the lower shaft 1b and the larger gear 7b with its protruding portions 81 being elastically distorted in the diameter direction and elastically pressed onto the inner circumferential face of the larger gear 7b. With this arrangement, the lower shaft 1b and the larger gear 7b are connected to each other by the elastic restoration force of the protruding portions 81 in a manner so as to freely rotate as an integral part. Here, when the circumferential force (torque), exerted on the lower shaft 1b, exceeds a setting torque (limit torque) corresponding to the amount of elastic distortion of the protruding portions 81, the slip ring 8 acts so as to allow slipping between the lower shaft 1b and the larger gear 7b.

As described above, when the force exerted on the fitting section between the larger gear 7b and the lower shaft 1b in the circumferential direction exceeds a predetermined amount, that is, when the torque transmitted between the two parts exceeds a predetermined upper torque limit, the slip ring 8, installed between the larger gear 7b and the lower shaft 1b of the hypoid gears 7, functions as a torque limiter for releasing the connection between the larger gear 7b and the lower shaft 1b. The upper torque limit which allows the connection to be released is related to the amount of distortion in the diameter direction applied to the protruding portions 81 of the slip ring 8. The amount of distortion is also related to the size of the fitting gap that is set in the fitting section between the lower shaft 1b and the larger gear 7b; therefore, it is possible to appropriately set the upper limit torque that allows the connection to be released by properly managing the dimensions of the outer diameter of the lower shaft 1b and the inner diameter of the fitting hole formed in the axial center portion of the larger gear 7b.

The gear housing 2b is provided with a motor bracket 20 that is installed slightly below the fitting portion of the larger gear 7b and that protrudes outward in the radial direction with a cylindrical shape. A motor M for steering assistance is secured to the end of the motor bracket 20. The smaller gear 7a of the hypoid gears 7 is integrally formed on the tip of the output shaft 21 of the motor M. The smaller gear 7a is allowed to enter the inside of the gear housing 2b through the motor bracket 20, and is engaged by the teeth face of the larger gear 7b fitted to the lower shaft 1b.

With this arrangement, the rotational force of the motor M is transmitted to the lower shaft 1b through the hypoid gears 7 consisting of the smaller gear 7a and the larger gear 7b, further transmitted to the rack teeth 50 through the pinion 10 that is formed on the periphery of the lower half portion of the lower shaft 1b, and then converted to a sliding force in the axial direction of the rack shaft 5 on which the rack teeth 50 are formed. Thus, it is possible to assist the steering operation as described earlier by the sliding movement of the rack shaft 5.

Based upon the results of detection of the steering torque that has been made by the torque sensor 6 that is installed between the upper and lower shafts 1a and 1b as described earlier, the motor M is driven so as to exert a rotational force in the direction of the steering torque that has been applied to the steering wheel 91 with a size corresponding to the steering torque. The rotational force generated by the motor M is converted to a force in the axial direction and applied to the rack shaft 5; thus, it becomes possible to reduce the steering force that is to be applied to the steering wheel 91.

Since the rotational force of the motor M is increased by the hypoid gear 7 having the construction as described earlier, and transmitted to the lower shaft 1b (pinion shaft 1), even a small-size motor M can exert a greater steering assisting force. Moreover, since the hypoid gears 7 are used as the transmission device for increasing the rotational force of the motor M, it becomes possible to make the shaft-to-shaft distance between the motor M and the pinion shaft 1 smaller.

Figure 1:
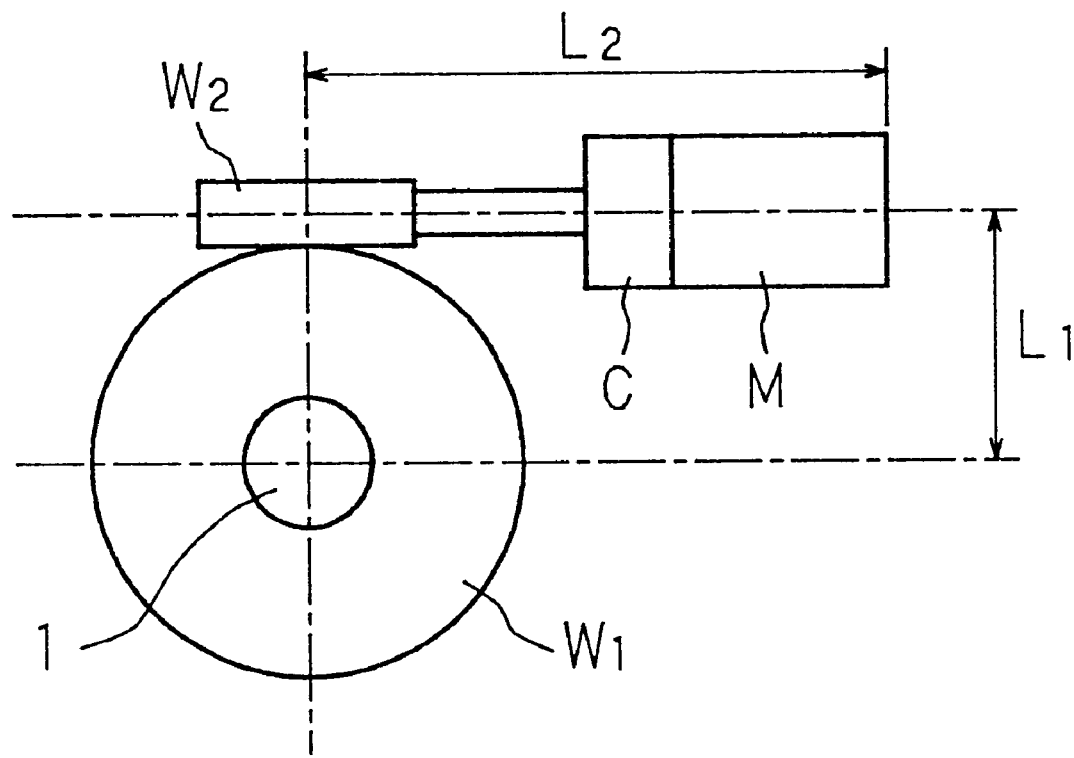
FIG. 1 is a drawing that schematically shows a transmission system from a motor to a pinion shaft in a conventional electric power steering apparatus.
Figure 6:
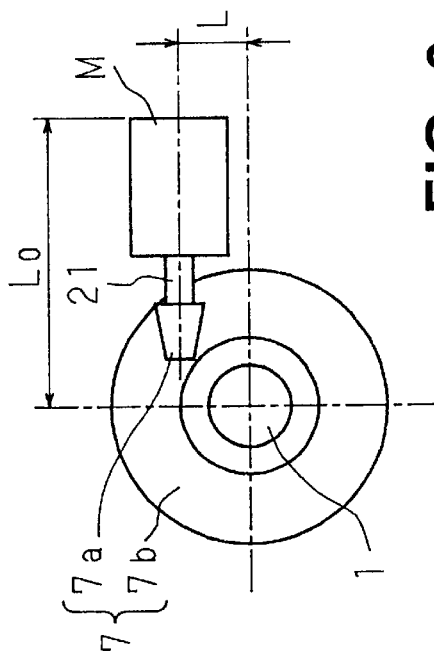
FIG. 6 is a drawing that schematically shows a transmission system from a motor to a pinion shaft in the electric power steering apparatus according to the present invention.

FIG. 6 is a drawing that schematically shows the construction of a transmission system from the motor M to the pinion shaft 1. In the present invention, in order to increase the rotational force of the motor M, the hypoid gear 7, which consists of the smaller gear 7a integrally formed on the output shaft 21 of the motor M and the larger gear 7b fitted to the pinion shaft 1 (lower shaft 1b), are used, and in the hypoid gears 7, the engagement of the smaller gear 7a to the larger gear 7b is made at an inner position than the peripheral portion of the larger gear 7b. In other words, a shaft-to-shaft distance L that is smaller than the radius of the larger gear 7b is maintained between the motor M that is coaxial with the smaller gear 7a and the pinion shaft 1 positioned on the axial center of the larger gear 7b. Therefore, the shaft-to-shaft distance L is sufficiently smaller than a shaft-to-shaft distance $L_1$ that is required for the worm gear shown in FIG. 1.

Consequently, it is possible to arrange the motor M properly in a manner so as not to greatly stick outward from the sensor housing 2a and the gear housing 2b that receive and support the pinion shaft 1. Moreover, it becomes possible to easily ensure a space to be occupied by the motor M inside the engine room where both of the housings 2a and 2b are placed.

Furthermore, in the electric power steering apparatus, it is necessary to provide a means by which, at the time of a locked state of the motor M, the connection of the motor M and the pinion shaft 1 is released so as to avoid an inoperable state of steering as described earlier. Here, in the present invention, the releasing operation of the connection is carried out by the slip ring 8 that is installed in the fitting section between the larger gear 7b and the lower shaft 1b of the hypoid gears 7 as described. The slip ring 8 slips when the transmission torque between the larger gear 7b and the lower shaft 1b exceeds a predetermined upper torque limit. This makes it possible to release the connection between the larger gear 7b and the lower shaft 1b, that is, the connection between the motor M and the pinion shaft 1. Therefore, by setting the upper torque limit at a value exceeding a torque corresponding to the maximum torque generation of the motor M, the release of the connection can be performed without adversely affecting the normal transmission from the motor M to the pinion shaft 1, thereby preventing from an inoperative state of steering.

As described above, in the present invention, the release of the connection between the motor M and the pinion shaft 1 at the time of a locked state of the motor M is carried out by the slip ring 8 installed between the larger gear 7b and the lower shaft 1b. This eliminates the necessity of an electromagnetic clutch that is to be connected to the output side of the motor M as a means for releasing the connection. Therefore, it is possible to minimize the length $L_0$ of the motor M in the axial direction, and consequently to ensure a space to be occupied by the motor M more easily.

With respect to the reduction ratio obtained by the hypoid gears 7 used as a force-increasing means for the motor M of the present invention, it is generally smaller than that obtained by a worm gear having a worm wheel whose diameter is same as the larger gear 7b. Moreover, in the case when a motor M having the same capacity as a conventional apparatus using a warm gear as the force-increasing means is used, the maximum value of the resulting steering assisting force is smaller than that of the conventional apparatus. Therefore, the steering assisting force may become insufficient in the large steering range in which a lot of force is required for steering.

Figure 7:
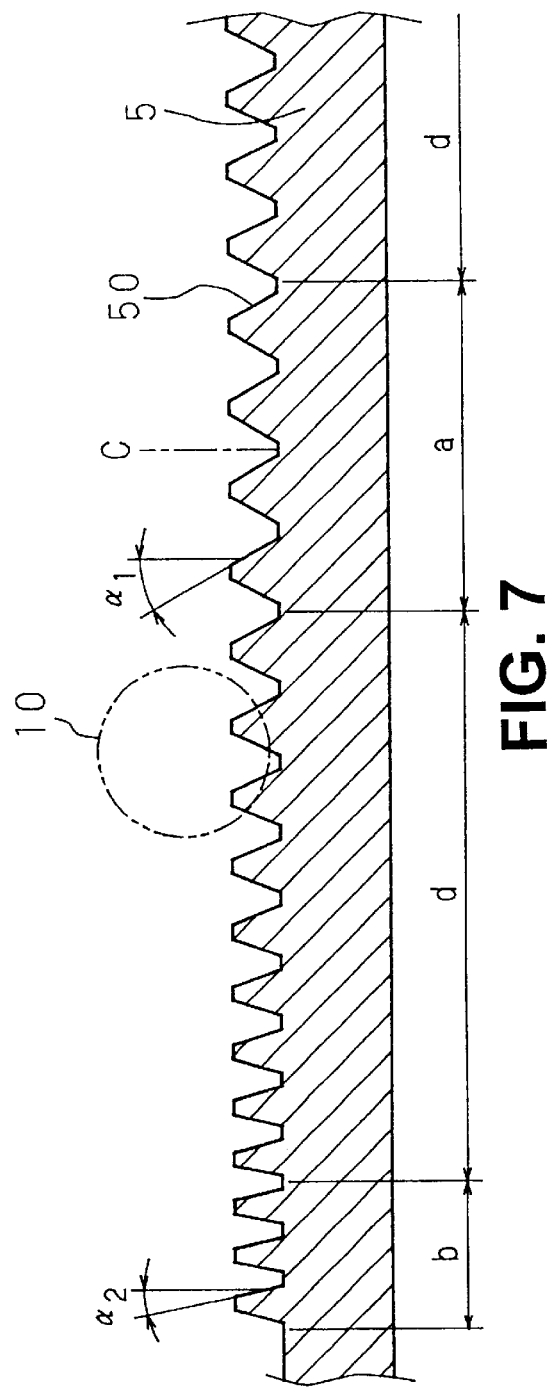
FIG. 7 is an explanatory drawing that shows a formation of rack teeth of a rack shaft in the electric power steering apparatus according to the present invention.

In the present invention, the hypoid gears 7 are used as the force-increasing means for the motor M, and the insufficient steering assisting force resulting from this construction is supplemented by adopting the following arrangement as shown FIG. 7 in the rack teeth 50 formed on the rack shaft 5.

As shown in FIG. 7, when it is assumed that the engaged position C of the pinion 10 is center at which the steering angle is zero, the rack teeth 50 are formed so as to provide a predetermined pressure angle $\alpha_1$ within a center range a having predetermined lengths on both sides of the center as shown in the drawing. Moreover, the rack teeth 50 are also formed so as to provide a predetermined pressure angle $\alpha_2$ that is smaller than the pressure angle $\alpha_1$ within two end ranges b (only one side of them is shown) having predetermined lengths from the respective ends in the formed range. Within intermediate ranges d between the range a and the ranges b, the rack teeth 50 are formed so as to provide a successively reducing pressure angle from $\alpha_1$ to $\alpha_2$ from the center range a toward the end ranges b, that is, toward the ends of the format on range of the rack teeth 50.

In the rack teeth 50 in which the pressure angle is set as described above, when the engaged position of the pinion 10 is located within the center range a, the pressure angle $\alpha_1$ of the rack teeth 50 located at the center range a is large, as indicated by its outline in a two-dot chain line of FIG. 7. Therefore, the amount of shift of the rack shaft 5 per unit rotation of the pinion 10 is large. In contrast, when the engaged position of the pinion 10 is located within the end ranges b, the pressure angle $\alpha_2$ of the rack teeth 50 at the end regions b is small. Therefore, the amount of shift of the rack shaft 5 per unit rotation of the pinion 10 is small. Moreover, when the engaged position of the pinion 10 is located within the intermediate range d, the amount of shift of the rack shaft 5 per unit rotation of the pinion 10 successively reduces from the center range a toward the end ranges b, that is toward the end portions of the moving stroke of the rack shaft 5.

As described above, the rotation of the pinion 10 is transmitted to the rack shaft 5 while being reduced in its speed toward the end portions of the moving stroke, that is, toward the large steering ranges at which a lot of force is required for steering. Therefore, after having been reduced by the hypoid gears 7 and transmitted to the pinion shaft 1, the rotational force of the motor M is further reduced by the engaging section of the pinion 10 and the rack teeth 50, and then transmitted to the rack shaft 5. This makes it possible to supplement the insufficient steering assisting force resulting from the adoption of the hypoid gears 7, and consequently to miniaturize the motor M.

As described above, in the electric power steering apparatus according to the present invention, since the hypoid gears 7 are adopted as the transmission device between the motor M and the pinion shaft 1, it becomes possible to ensure to a space to be occupied by the motor M on the periphery of the sensor housing 2a and the gear housing 2b. Moreover, since the pressure angle of the rack teeth 50 formed on the rack shaft 5 is designed so as to reduce toward the stroke ends, it becomes possible to supplement the insufficient steering assisting force resulting from the adoption of the hypoid gears 7 without making the motor M bulky, that is, without enlarging the space to be occupied by the motor M.

Additionally, the above-mentioned embodiment has exemplified an electric power steering apparatus of the pinion transmission type in which the transmission from a steering assisting motor M is applied to the pinion shaft 1. However, the present invention is not intended to be limited thereby, and is of course applied to an electric power steering apparatus of the column transmission type in which the transmission from the motor M is applied to the column shaft 92.

As this invention may be embodied in several forms without departing from the spirit of essential characteristics thereof, the present embodiment is therefore illustrative and not restrictive, since the scope of the invention is defined by the appended claims rather than by the description preceding them, and all changes that fall within metes and bounds of the claims, or equivalence of such metes and bounds thereof are therefore intended to be embraced by the claims.

What is claimed is:

1. An electric power steering apparatus, comprising:

a column shaft connected to a steering wheel;

a pinion shaft connected to said column shaft on which a pinion gear is located;

a rack shaft having rack teeth engaging with the pinion gear and arranged to move in the axial direction within a range of its moving stroke corresponding to the formed length of the rack teeth in response to a rotational movement of said pinion shaft, wherein the rack teeth are formed so that the pressure angle thereof reduces toward both ends of the moving stroke;

an electric motor for steering assistance; and a hypoid gear pair provided between said electric motor and said column shaft or said pinion shaft so that a rotational force of said electric motor is reduced in speed and increased in power, and then is transmitted to said column shaft or said pinion shaft, wherein said electric power steering apparatus assists a steering operation that is carried out by the movement of said rack shaft by transmitting the rotational force of said electric motor to said column shaft or said pinion shaft through said hypoid gear pair;

further comprising a housing and a bearing, the hypoid gear pair including a gear of larger size which is supported at an outer circumferential position, in a radial direction, by the housing via the bearing.

2. An electric power steering apparatus as in claim 1 wherein said hypoid gear pair comprises two meshing gears of different sizes meshing at an angle of about 90° with respect to each other.

3. An electric power steering apparatus as in claim 2 wherein the distance between the central axes of the gears is less than the radius of the larger gear of the pair.

4. An electric power steering apparatus, comprising:
a column shaft which rotates in association with a steering wheel;
a pinion shaft which rotates in association with said column shaft;
a pinion gear formed on the pinion shaft;
a rack shaft having rack teeth engaging with said pinion gear and arranged to move in the axial direction within a range of its moving stroke corresponding to the formed length of the rack teeth in response to a rotational movement of said pinion shaft, said rack teeth formed with the pressure angle being reduced toward both ends of the moving stroke;
an electric motor for steering assistance; and
a transmission device provided between said electric motor and said column shaft or said pinion shaft,
wherein said Transmission device comprises a hypoid gear pair having a smaller gear of the gear pair on said electric motor side and a larger gear of the gear pair on said column shaft side or said pinion shaft side, and
said electric power steering apparatus assists a steering operation that is carried out by the movement of said rack shaft by transmitting the rotational force of said electric motor to said column shaft or said pinion shaft through said transmission device;
further comprising a housing and a bearing, the gear of larger size being supported at an outer circumferential position, in a radial direction, by the housing via the bearing.

5. An electric power steering apparatus, comprising;
a column shaft connected to a steering wheel;
a pinion shaft connected to said column shaft on which a pinion gear is formed;
a rack shaft having rack teeth engaging with the pinion gear and being arranged to move in the axial direction within a range of its moving stroke corresponding to the formed length of the rack teeth in response to a rotational movement of said pinion shaft, wherein the rack teeth being formed so that the pressure angle thereof reduces toward both ends of the moving stroke;
an electric motor for steering assistance; and
a hypoid gear pair provided between said electric motor and said column shaft or said pinion shaft so that a rotational force of said electric motor is reduced in speed and increased in power, and then transmitted to said column shaft or said pinion shaft,
wherein said electric power steering apparatus assists a steering operation that is carried out by the movement of said rack shaft by transmitting the rotational force of said electric motor to said column shaft or said pinion shaft through said hypoid gear pair,
wherein a gear of larger side of said hypoid gear pair is externally fitted to said column shaft or said pinion shaft, and
said electric power steering apparatus further comprising:
a torque limiter which is provided in a fitting section between the gear and said column shaft or said pinion shaft and allows a relative rotation when a torque between the gear and said column shaft or said pinion shaft exceeds a predetermined value;
further comprising a housing and a bearing, the gear of larger size being supported at an outer circumferential position, in a radial direction, by the housing via the bearing.

6. An electric power steering apparatus, comprising:
a column shaft connected To a steering wheel;
a pinion shaft connected to said column shaft on which a pinion gear is formed;
a rack shaft having rack teeth engaging with the pinion gear and being arranged to move in the axial direction within a range of its moving stroke corresponding to the formed length of the rack teeth in response to a rotational movement of said pinion shaft, wherein the rack teeth being formed so that the pressure angle thereof reduces toward both ends of the moving stroke;
an electric motor for steering assistance; and
a hypoid gear pair provided between said electric motor and said column shaft or said pinion shaft so that a rotational force of said electric motor is reduced in speed and increased in power, and then transmitted to said column shaft or said pinion shaft,
wherein said electric power steering apparatus assists a steering operation That is carried out by the movement of said rack shaft by transmitting the rotational force of said electric motor to said column shaft or said pinion shaft through said hypoid gear pair,
wherein a gear of larger side of said hypoid gear pair is externally fitted to said column shaft or said pinion shaft, and
said electric power steering apparatus further comprising:
a slip ring which is provided in a fitting section between the gear and said column shaft or said pinion shaft and allows slipping of the fitting section upon-receipt of a circumferential force exceeding a predetermined limit;
further comprising a housing and a bearing, the gear of larger size being supported at an outer circumferential position, in a radial direction, by the housing via the bearing.

7. An electric power steering apparatus, comprising:
a column shaft which rotates in association with a steering wheel;
a pinion shaft which rotates in association with said column shaft;
a pinion gear formed on the pinion shaft:
a rack shaft having rack teeth engaging with said pinion gear and being arranged to move in the axial direction within a range of its moving stroke corresponding to the formed length of the rack teeth in response to a rotational movement of said pinion shaft:
an electric motor for steering assistance; and
a transmission device provided between said electric motor and said column shaft or said pinion shaft,
wherein said transmission device is constituted by hypoid gears having a smaller gear on said electric motor said and a larger gear on said column shaft side or said pinion shaft side,
said rack teeth are formed so that the pressure angle thereof reduces toward both ends of the moving stroke, and said electric power steering apparatus assists a steering operation that is carried out by the movement of said rack shaft by transmitting the rotational force of said electric motor to said column shaft or said pinion shaft through said transmission device, wherein said larger gear is externally fitted to said column shaft or said pinion shaft, and said electric power steering apparatus further comprising;
a torque limiter which is provided in a fitting section between the larger gear and said column shaft or said pinion shaft and allows a relative rotation when a torque between the larger gear and said column shaft or said pinion shaft exceeds a predetermined value;
further comprising a housing and a bearing, the gear of larger size being supported at an outer circumferential position, in a radial direction, by the housing via the bearing.

8. An electric power steering apparatus, comprising:

a column shaft which rotates in association with a steering wheel;

a pinion shaft which rotates in association with said column shaft;

a pinion gear formed on the pinion shaft;

a rack shaft having rack teeth engaging with said pinion gear and being arranged to move in the axial direction within a range of its moving stroke corresponding to the formed length of the rack teeth in response to a rotational movement of said pinion shaft;

an electric motor for steering assistance; and a Transmission device provided between said electric motor and said column shaft or said pinion shaft, wherein said transmission device is constituted by hypoid gears having a smaller gear on said electric motor said and a larger gear on said column shaft side or said pinion shaft side, said rack teeth are formed so that the pressure angle thereof reduces toward both ends of the moving stroke, and said electric power steering apparatus assists a steering operation that is carried out by the movement of said rack,shaft by transmitting the rotational force of said electric motor to said column shaft or said pinion shaft through said transmission device, wherein said larger gear is externally fitted to said column shaft or said pinion shaft, and said electric power steering apparatus further comprising:
a slip ring which is provided in a fitting section between the larger gear and said column shaft or said pinion shaft and allows slipping of the fitting section upon receipt of a circumferential force exceeding a predetermined limit;
further comprising a housing and a bearing, the gear of larger size being supported at an outer circumferential position, in a radial direction, by the housing via the bearing.

* * * * *